W. P. HALE.
Saw-Teeth.

No. 162,061. Patented April 13, 1875.

WITNESSES:
P. C. Dieterich
W. R. McArthur

INVENTOR:
Wm. P. Hale
per J. H. Alexander
ATTORNEY.

THE GRAPHIC CO.PHOTO-LITH.39 & 41 PARK PLACE,N.Y.

UNITED STATES PATENT OFFICE.

WILLIAM P. HALE, OF PORT HURON, MICHIGAN.

IMPROVEMENT IN SAW-TEETH.

Specification forming part of Letters Patent No. 162,061, dated April 13, 1875; application filed February 12, 1875.

*To all whom it may concern:*

Be it known that I, WM. P. HALE, of Port Huron, in the county of St. Clair and State of Michigan, have invented certain new and useful Improvements in Saw-Teeth; and I do hereby declare that the following is a full, clear, and exact description thereof, reference being had to the accompanying drawings and to the letters of reference marked thereon, which form part of this specification.

My invention relates to what are known as inserted teeth for circular saws; and it consists in the construction of a saw-tooth with a projecting flange on both sides along the front or cutting edge, and with miter corners in the saw.

In order to enable others skilled in the art to which my invention appertains to make and use the same, I will now proceed to describe its construction and operation, referring to the annexed drawing, in which—

Figure 1:
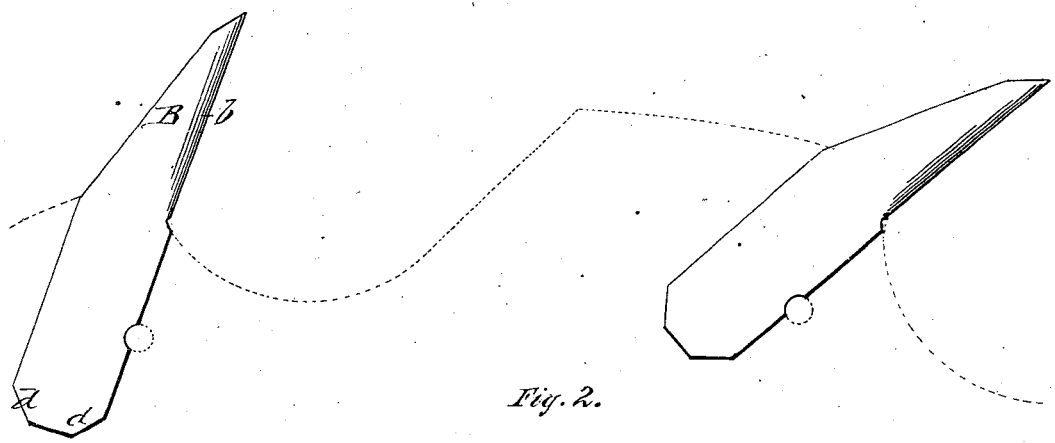
Figure 2:
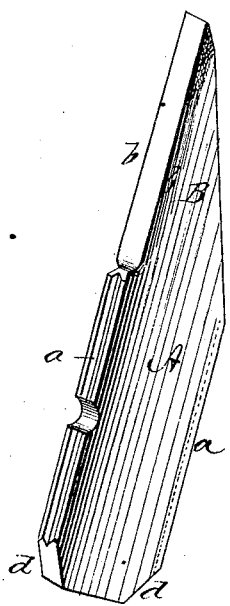

Figure 1 is a side view of a part of the saw-blade, with my improved saw-tooth inserted therein. Fig. 2 is a perspective view of the saw-tooth.

A represents the saw-tooth, provided with a groove, $a$, along both its front and rear edges. The point B of the tooth is formed with a projecting flange, $b$, on both sides of the front or cutting edge, for the purpose of clearing the kerf. The face of the point B may be flat or concave, as desired. The inner end or heel of the tooth is formed with miter corners $d\ d$, for the purpose of preventing the saw from cracking.

Having thus fully described my invention, what I claim as new, and desire to secure by Letters Patent, is—

The insertable saw-tooth A B, provided with grooves $a\ a$, projecting flanges $b\ b$ along the front or cutting edge, and miter corners $d\ d$ at the heel, constructed substantially as shown and described, as and for the purpose set forth.

In testimony that I claim the foregoing as my own I affix my signature in presence of two witnesses.

WILLIAM P. HALE.

Witnesses:
JAMES J. BARRY,
MILES H. CARLETON.